United States Patent [19]

Ring et al.

[11] Patent Number: 5,778,695
[45] Date of Patent: Jul. 14, 1998

[54] LIQUID LEVEL SENSOR USING REFRIGRANT SUBCOOLING

[75] Inventors: H. Kenneth Ring, Houston, Minn.; Jon P. Hartfield, La Crosse, Wis.

[73] Assignee: American Standard Inc., Piscataway, N.J.

[21] Appl. No.: 859,900

[22] Filed: May 21, 1997

[51] Int. Cl.[6] .................................................. F25B 41/04
[52] U.S. Cl. ........................... 62/218; 62/126; 73/295; 340/622
[58] Field of Search ........................ 62/218, 219, 220, 62/221, 126, 129; 73/295; 340/618, 620, 622, 623, 624, 625

[56] References Cited

U.S. PATENT DOCUMENTS

| | | | |
|---|---|---|---|
| 3,381,491 | 5/1968 | Harnish | 62/218 |
| 3,415,070 | 12/1968 | Weum | 62/129 |
| 4,090,371 | 5/1978 | Keane | 62/129 |
| 4,291,544 | 9/1981 | Larsen | 62/221 |
| 4,809,129 | 2/1989 | Hansen, III et al. | 361/284 |
| 5,031,068 | 7/1991 | Hansen, III et al. | 361/284 |
| 5,079,930 | 1/1992 | Beaverson et al. | 62/129 |
| 5,209,080 | 5/1993 | Zinsmeyer | 62/216 |
| 5,285,653 | 2/1994 | Meloling et al. | 62/218 |
| 5,417,078 | 5/1995 | Huenniger et al. | 62/218 |
| 5,435,145 | 7/1995 | Jaster | 62/218 X |
| 5,541,969 | 7/1996 | Matterson et al. | 73/295 X |
| 5,655,379 | 8/1997 | Jaster et al. | 62/218 X |

*Primary Examiner*—Harry B. Tanner
*Attorney, Agent, or Firm*—William J. Beres; William O'Driscoll; Peter D. Ferguson

[57] ABSTRACT

A fluid level sensor. The sensor comprises a housing; a chamber enclosed by the housing; a liquid port in a lower area of the housing operable to connect the chamber to a lower, liquid containing area of a heat exchanger; and a gas port located in an upper area of the housing and operable to connect the chamber to an upper, vapor containing area of a heat exchanger. The sensor includes first and second apertures in the housing; and cooling conduit passing through the chamber and through the first and second apertures and operable to cool the chamber. There is at least one sensor located in the chamber and adapted to sense a temperature of fluid in the chamber.

25 Claims, 3 Drawing Sheets

LIQUID LEVEL SENSOR USING REFRIGRANT SUBCOOLING

BACKGROUND OF THE INVENTION

The present invention is directed to a liquid level sensor. More specifically, the liquid level sensor senses the liquid level of a heat exchanger by subcooling a fluid from the heat exchanger and by measuring temperature to detect the variation between the temperature of the fluid's vaporous state and the temperature of the fluid's subcooled liquid state.

Most refrigerant level sensors have moving parts. For example, U.S. Pat. No. 5,416,078 to Huenniger et al. includes a float member which floats on refrigerant liquid in a condenser sump and is slideably disposed on a standpipe. The float and a metering sleeve travel up and down together relative to the standpipe. Similar float type refrigerant control devices are shown in the U.S. Pat. No. 5,285,653 to Meloling et al. and U.S. Pat. No. 5,209,080 to Zinsmeyer. Float type refrigerant control devices have moving parts, and run the risk that the moving part will cease to move if it sticks in one position, if it is wedged in a place, or if the moving part breaks. Additionally, the manufacturing challenges are enhanced where a metering sleeve must be slideably disposed within a standpipe.

SUMMARY OF THE INVENTION

It is an object, feature and advantage of the present invention to solve the problems of the prior art.

It is an object, feature and advantage of the present invention to provide a liquid level sensor which senses liquid level by measuring temperature.

It is an object, feature and advantage of the present invention to provide a liquid level sensor which does not have moving parts.

It is an object, feature and advantage of the present invention to provide a liquid level sensor for a device such as a heat exchanger where the liquid level sensor does not require electrical parts or connections within the heat exchanger itself.

It is a further object, feature and advantage of the present invention that the liquid level sensor be external of the heat exchanger and easily accessible for service.

It is an object, feature and advantage of the present invention to provide a liquid level sensor which is reliable and easy to service.

It is an object, feature and advantage of the present invention to provide a liquid level sensor which measures liquid level by subcooling the liquid whose level is to be measured.

It is a further object, feature and advantage of the present invention to measure that liquid level by measuring temperature.

The present invention provides a fluid level sensor. The sensor includes a housing; a chamber enclosed by the housing; a liquid port in a lower area of the housing operable to connect the chamber to a lower, liquid containing area of a heat exchanger; and a gas port located in an upper area of the housing and operable to connect the chamber to an upper, vapor containing area of a heat exchanger. The sensor also includes first and second apertures in the housing; cooling conduit passing through the chamber and through the first and second apertures and operable to cool the chamber; and at least one sensor located in the chamber and adapted to sense a temperature of fluid in the chamber.

The present invention also provides a method of controlling an expansion valve. The method comprises the steps of providing at least one sensor in a standpipe; connecting the standpipe to a vaporous region and to a liquid region of a heat exchanger whose liquid level is to be measured; allowing refrigerant vapor and liquid to pass back and forth between the heat exchanger and the standpipe; cooling the refrigerant in the standpipe; sensing whether the cooled refrigerant has been subcooled at at least one location in the standpipe; and controlling an expansion valve based on the sensed subcooled refrigerant.

The present invention further provides an air conditioning system. The system comprises: a compressor; a first heat exchanger; an expansion valve; a second heat exchanger; and conduit sequentially linking the compressor, the first heat exchanger, the expansion valve, and the second heat exchanger into a flow circuit. The system includes a liquid level sensor operably associated with the first heat exchanger. The sensor includes a housing, a vapor port in the housing connected to a vaporous region of the first heat exchanger, a liquid port in the housing connected to a liquid region of the first heat exchanger, a chamber within the housing and open to the liquid and vapor ports so as to receive liquid and vaporous refrigerant from the first heat exchanger and establish a liquid level in the chamber representative of the refrigerant level in the first heat exchanger, cooling conduit for cooling the interior of the chamber, and at least one sensor located proximal a desired liquid level in the chamber and measuring a condition in the chamber. The system also includes a controller operably connected to the sensor and receiving a signal from the sensor representative of the measured condition. The controller is operable to control the expansion valve as a function of the condition signal.

The present invention also provides a liquid level sensor. The liquid level sensor comprises: a housing; a chamber in the housing; upper and lower ports in the housing open to the chamber and allowing liquid and vaporous fluid to enter the chamber and establish a liquid level within the chamber; apparatus for cooling the fluid in the chamber; and a sensor for sensing subcooling of the liquid fluid in the chamber at or near a desired liquid level.

The present invention additionally provides a method of measuring liquid level in a heat exchanger. The method comprises the steps of: providing vapor and liquid communication between the heat exchanger and a sensing device so as to establish a liquid level within the sensing device which is representative of the liquid level in the heat exchanger; subcooling the liquid in the sensing device; measuring a temperature representative of a desired liquid level in the sensing device; and determining the liquid level from the measured temperature.

DETAILED DESCRIPTION OF THE DRAWINGS

Figure 1:
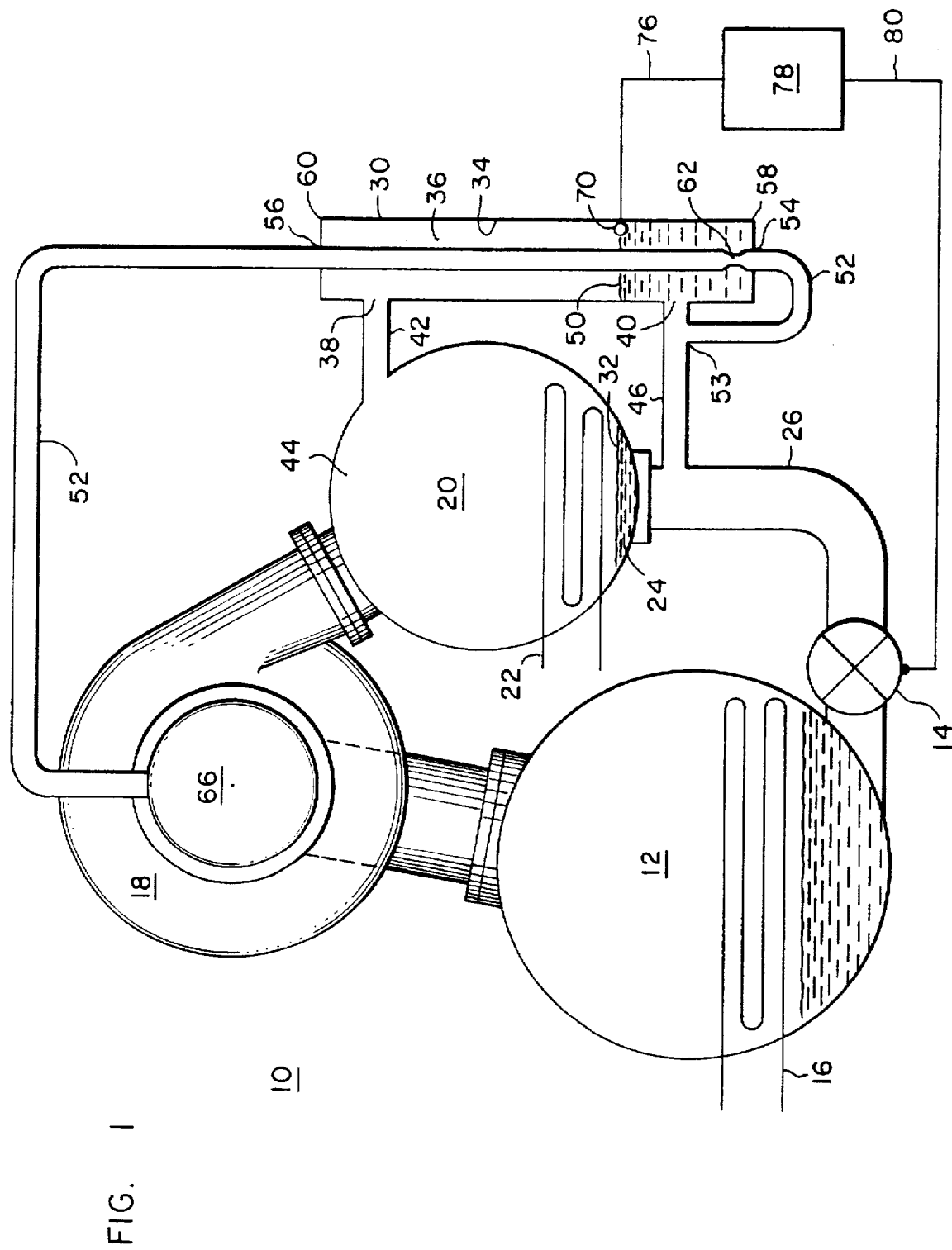
FIG. 1 is a drawing of a centrifugal refrigeration system having a first preferred embodiment of a liquid level sensor in accordance with the present invention.
Figure 2:
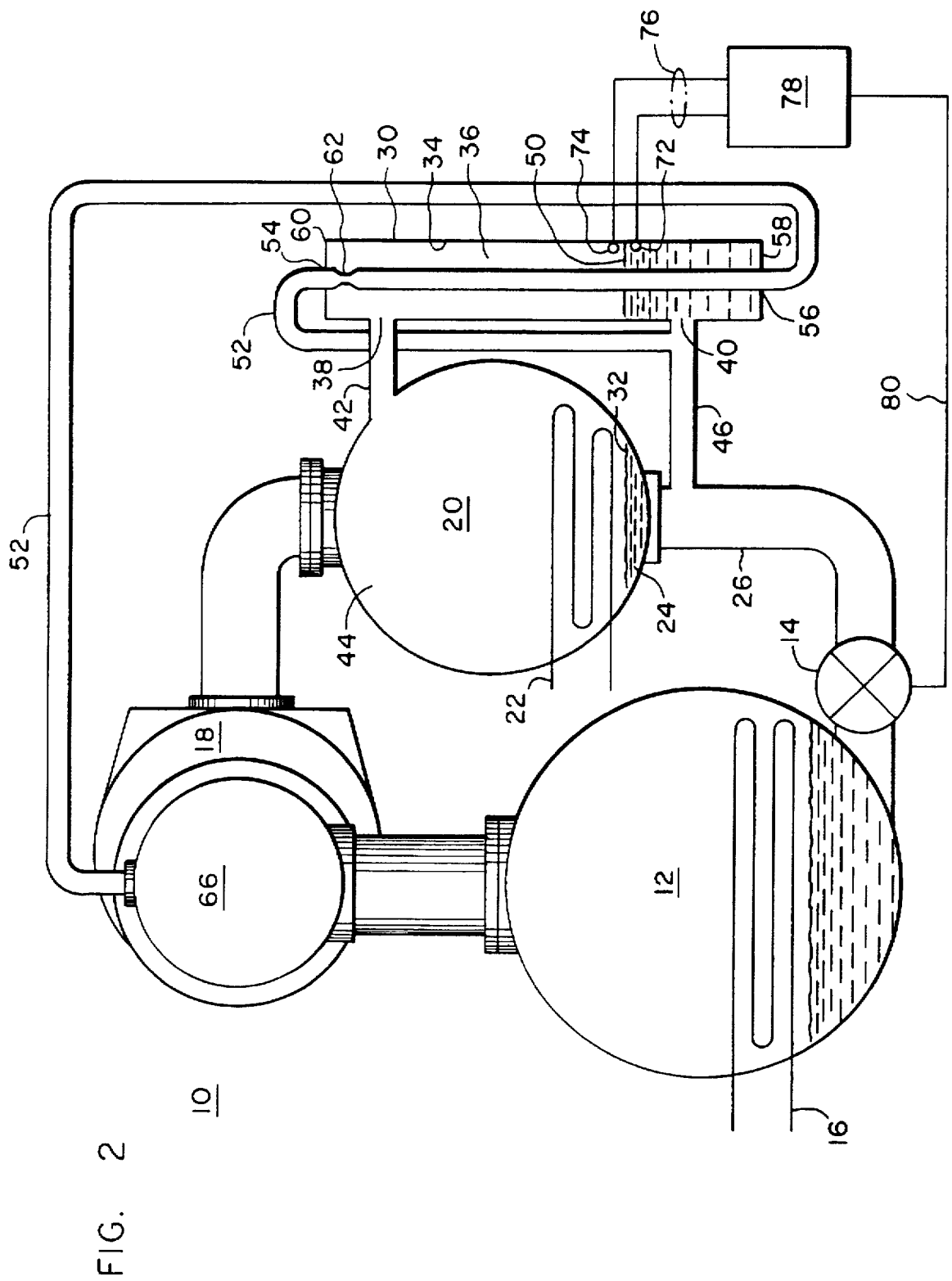
FIG. 2 shows a screw type refrigeration system having a second preferred embodiment of a liquid level sensor in accordance with the present invention.

FIGS. 1 and 2 are variations of a typical commercial refrigeration system 10 which includes the present invention. Other potential variations include systems with economizers and air cooled systems.

In the system 10 high pressure liquid refrigerant enters a lower pressure evaporator 12 through a metering device such as an expansion valve 14. When the liquid refrigerant passes through the expansion valve 14 its pressure is abruptly reduced to that of the evaporator 12. In this process, a portion of the refrigerant experiences a phase change from liquid to gaseous state and the entire refrigerant flow experiences a reduction in temperature corresponding to thermodynamic equilibrium at evaporator pressure. Once in the evaporator 12, the now cold liquid refrigerant absorbs heat from a comparatively warm system fluid 16, such as air or preferably water, and the refrigerant evaporates in the process. The transfer of heat associated with this evaporative process lowers the temperature of the system fluid 16, providing a desired cooling effect. In the process of absorbing the heat from the system fluid, the liquid refrigerant vaporizes and the vapor leaves the evaporator 12.

Maintaining the pressure difference between the high and low pressure sides of the refrigerant cycle, a compressor 18 draws the relatively cool, low pressure refrigerant vapor from the evaporator 12, compresses the vapor, then discharges the compressed vapor. The relatively hot, high pressure vapor is then directed into a condenser 20. In the condenser 20, the heat of vaporization and compression carried by the refrigerant is transferred to cooling fluid 22 such as air or preferably water, causing the vapor to condense at a relatively high pressure and temperature into a high pressure liquid. The high pressure liquid refrigerant accumulates in a condenser sump 24 and in piping 26 connecting the sump 24 to the expansion valve 14. The high pressure liquid refrigerant returns to the expansion valve 14 and the cycle repeats itself.

The present invention is directed to a liquid level sensor 30 for sensing the liquid level 32 in the condenser 20. The liquid level sensor 30 includes a housing 34 enclosing a chamber 36 and is preferably elongated in a vertical direction so as to form a standpipe. The housing includes an upper vapor port 38 and a lower liquid port 40. The upper vapor port 38 is connected by conduit 42 to an upper vaporous area 44 of the condenser 20. The lower port 40 is connected by conduit 46 to the sump 24 or to the piping 26. Refrigerant vapor from the condenser 20 is able to pass back and forth between the condenser 20 and the sensor 30, and liquid refrigerant is able to pass back and forth between the condenser 20 and the sensor 30 through the conduit 46 and the port 40. The liquid refrigerant in the sensor 30 therefore stabilizes at a liquid level 50 which is approximately the same height as the liquid level 32 in the condenser 20.

A key aspect of the invention is the cooling of the chamber 36 by means of cooling conduit 52, preferably using liquid refrigerant from the sump 24. The cooling conduit 52 has a first end 53 which is connected to a source of cooled fluid, preferably condensed liquid from anywhere along the bottom of the sump 24, but alternatively from other parts of the system 10 or from a separate refrigeration system. The cooling conduit 52 enters the liquid level sensor 30 through a first housing aperture 54 and exits the sensor 30 through a second housing aperture 56. As shown in FIG. 1, the cooling conduit 52 may proceed through the sensor 30 in a bottom-to-top direction such that the first aperture 54 is in a lower portion 58 of the housing 34 and the second aperture is in an upper housing portion 60 of FIG. 1. Alternatively, as shown in FIG. 2, the cooling conduit 52 may proceed through the sensor 30 in a top-to-bottom direction such that the first aperture 54 is in the upper portion 60 of the housing 34 and the second aperture is in the lower housing portion 58 in FIG. 2. Other variations such as entering or exiting from a side of the housing 34 are also contemplated. The cooling conduit 52 may also be coiled within the chamber 36 and may be implemented as plain or enhanced tubing.

The cooling conduit 52 includes a metering device 62 located proximal the entrance of the cooling conduit 52 into the chamber 36. The metering device 62 meters and reduces the pressure of the refrigerant within the cooling conduit 52, essentially drawing refrigerant from the sump 24 into the cooling conduit 52. After passing through the metering device 62, the low pressure refrigerant in the cooling conduit 52 absorbs heat from the chamber 36, cooling the vaporous and liquid refrigerant in the chamber 36. The vaporized refrigerant in the cooling conduit 52 is preferably directed to the compressor motor 66 and used to cool that motor 66, but may alternatively be returned downstream of the motor to an economizer or to the evaporator. To operate, the cooling conduit 52 need only discharge into an area having less pressure than the pressure of the condenser.

The cooling effect of the low pressure refrigerant in the cooling conduit 52 subcools the liquid refrigerant in the chamber 36. This subcooling can be detected by a temperature sensing device 70 or devices 72, 74 such as a thermistor. The temperature signal from these temperature sensing devices 70, 72, 74 is fed by an electrical connection 76 to an expansion valve controller 78 and used to control the operation of the expansion valve 14 via another electrical connection 80.

Although the cooling conduit 52 is preferably located within the chamber 36, the cooling conduit may alternatively be wrapped or coiled around the outside of the housing 34 so as to cool the interior of the housing 34.

Figure 3:
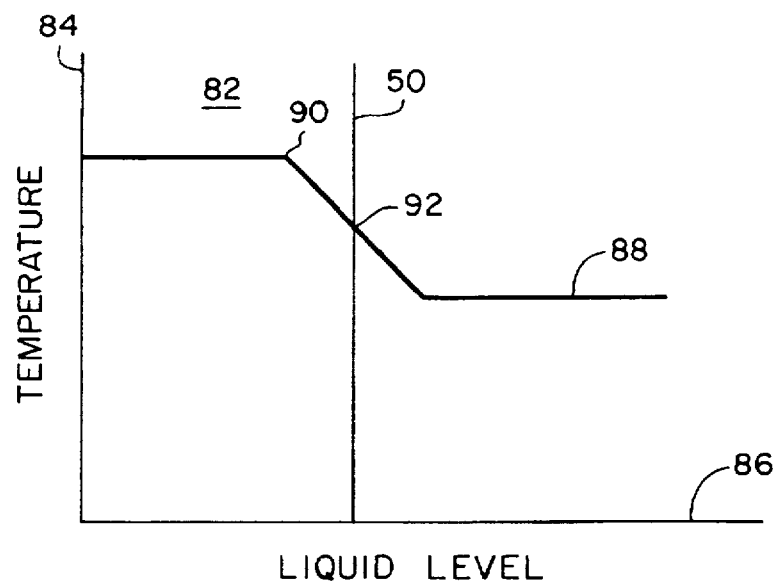
FIG. 3 is a graph of temperature versus liquid level for the first preferred embodiment shown in FIG. 1.

FIG. 3 is a graph 82 illustrating how the single sensor 70 is used in FIG. 1. That temperature sensing device 70 is empirically located at the desired liquid level 50. In the graph 82, temperature is indicated on the Y-axis 84 and liquid level is indicated on the X-axis 86. A line 88 indicates the temperature at the sensing device 70 as a function of liquid level and further indicates that the temperature level remains fairly constant while the sensor 70 is reading vaporous refrigerant. The vaporous refrigerant remains at a constant saturated temperature as some liquid is condensed upon the cooling conduit 52 within the chamber 36. At point 90, the liquid refrigerant has risen to where subcooled liquid refrigerant begins to contact the sensor 70. As the refrigerant level continues to increase, the temperature drops as the sensor 70 reads the temperature of the subcooled liquid refrigerant. The sensor 70, as noted previously, is located empirically at the desired liquid level 50 and preferably at the sharpest slope 92 of the line 88. At this point 92, variations from the desired liquid level 50 are easily detectable and the controller 78 can adjust the expansion valve 14 to maintain that desired liquid level 50.

Figure 4:
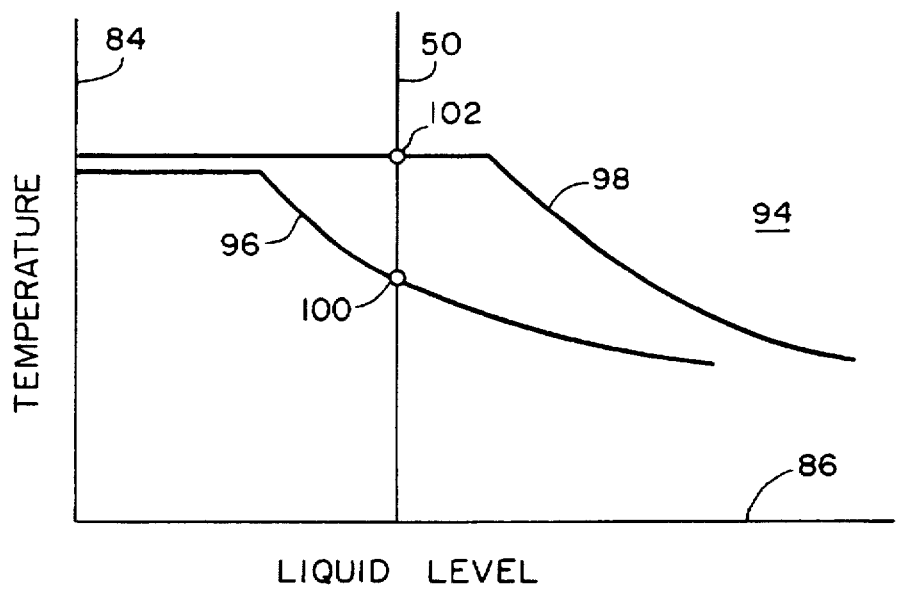
FIG. 4 is a graph of temperature versus liquid level for the second preferred embodiment shown in FIG. 2.

FIG. 4 is a graph 94 with temperature indicated on the Y-axis 84 and liquid level indicated on the X axis 86. FIG. 4 represents the use of the two temperature sensors 72, 74 shown in FIG. 2. The sensors 72, 74 are empirically located to bracket the desired liquid level 50. For example, sensor 72 is preferably located about an inch below the desired liquid level 50 and sensor 74 is preferably located about an inch above the desired liquid level 50. The line 96 represents the measured temperature signal from the lower sensor 72 and the line 98 represents the measured temperature signal from the upper sensor 74. The lower sensor 72 will be measuring a subcooled signal when in its desired region of operation 100, whereas the upper sensor 74 will be measuring a constant, saturated temperature in its desired region of operation 102. This provides accurate temperature readings relative to the desired liquid level 50 and consequently provides very accurate control of the expansion valve 14 to maintain the desired liquid level 50.

What has been shown is a liquid level sensor particularly for use in a heat exchanger of a refrigeration system. The liquid level sensor has no moving parts and does not require electrical connections within the heat exchanger itself. Additionally, the liquid level is able to measure that liquid level by sensing temperature rather than using a float switch. This is accomplished by subcooling, in the sensor itself, the liquid to be measured.

Clearly, a person of ordinary skill in the art will recognize that many variations and modifications to the present invention can be made. Such modifications include the use of more than the one or two sensors of the two preferred embodiments such that sensors might be regularly or irregularly spaced at various heights in the standpipe so as to measure various refrigerant levels as might occur due to seasonal variations in refrigerant usage. Also, the liquid whose level is being measured need not necessarily a refrigerant but only be a fluid capable of being subcooled. The liquid level sensor is preferably located external of the heat exchanger so that no electrical connections are required within the heat exchanger and so that the sensor is readily accessible for servicing. However, the liquid level sensor may be located within the heat exchanger with modifications made by a person with ordinary skill in the art. All such changes and modifications are contemplated to fall within the scope of the claimed invention.

What is claimed for letters patent of the united states is as follows:

1. A fluid level sensor comprising:
   a housing;
   a chamber enclosed by the housing;
   a liquid port in a lower area of the housing operable to connect the chamber to a lower, liquid containing area of a heat exchanger;
   a gas port located in an upper area of the housing and operable to connect the chamber to an upper, vapor containing area of a heat exchanger;
   first and second apertures in the housing;
   cooling conduit passing through the chamber and through the first and second apertures and operable to cool the chamber; and
   at least one sensor adapted to sense a temperature of fluid in the chamber or in the housing of the chamber.

2. The sensor of claim 1 further including a metering device located in the cooling conduit.

3. The sensor of claim 2 wherein the housing is vertically elongated.

4. The sensor of claim 3 wherein the at least one sensor is located in the chamber substantially at a desired liquid level.

5. The sensor of claim 4 wherein the metering device is located proximal the upper area of the housing.

6. The sensor of claim 4 wherein the metering device is located proximal the lower area of the housing.

7. The sensor of claim 3 further including two sensors located in the chamber so as to bracket a desired liquid level.

8. The sensor of claim 7 wherein the metering device is located proximal the upper area of the housing.

9. The sensor of claim 7 wherein the metering device is located proximal the lower area of the housing.

10. A method of controlling an expansion valve comprising the steps of:
    providing at least one sensor in a standpipe;
    connecting the standpipe to a vaporous region and to a liquid region of a heat exchanger whose liquid level is to be measured;
    allowing refrigerant vapor and liquid to pass back and forth between the heat exchanger and the standpipe;
    cooling the refrigerant in the standpipe;
    sensing whether the cooled refrigerant has been subcooled at at least one location in the standpipe; and
    controlling an expansion valve based on the sensed subcooled refrigerant.

11. The method of claim 10 wherein the step of providing at least one sensor in a standpipe further includes locating that sensor at a desired liquid level.

12. The method of claim 10 wherein the step of providing at least one sensor further includes the step of providing two sensors located in the standpipe so as to bracket a desired liquid level.

13. The method of claim 10 wherein the cooling step includes the step of using refrigerant from the heat exchanger to cool the standpipe.

14. The method of claim 13 wherein the using refrigerant step further includes the step of metering the refrigerant being used to cool the standpipe.

15. An air conditioning system comprising:
    a compressor;
    a first heat exchanger;
    an expansion valve;
    a second heat exchanger;
    conduit sequentially linking the compressor, the first heat exchanger, the expansion valve, and the second heat exchanger into a circuit;
    a liquid level sensor operably associated with the first heat exchanger, the sensor including a housing, a vapor port in the housing connected to a vaporous region of the first heat exchanger, a liquid port in the housing connected to a liquid region of the first heat exchanger, a chamber within the housing and open to the liquid and vapor ports so as to receive liquid and vaporous refrigerant from the first heat exchanger and establish a liquid level in the chamber representative of the refrigerant level in the first heat exchanger, cooling conduit for cooling the interior of the chamber, and at least one sensor located proximal a desired liquid level in the chamber and measuring a condition in the chamber; and
    a controller operably connected to the sensor and receiving a signal from the sensor representative of the measured condition, the controller being operable to control the expansion valve as a function of the condition signal.

16. The air conditioning system of claim 15 wherein the measured condition is temperature, pressure, or electrical activity.

17. The air conditioning system of claim 16 wherein the sensor is positioned at the desired liquid level.

18. The air conditioning system of claim 16 wherein the sensor comprises two sensors bracketing the desired liquid level.

19. The air conditioning system of claim 15 wherein the cooling conduit for cooling the interior of the chamber further includes a metering device located within the cooling conduit proximal the entrance of the cooling conduit into the chamber.

20. A liquid level sensor comprising:

a housing;

a chamber in the housing;

upper and lower ports in the housing open to the chamber and allowing liquid and vaporous fluid to enter the chamber and establish a liquid level within the chamber;

apparatus for cooling the fluid in the chamber; and a sensor for sensing subcooling of the liquid fluid in the chamber at or near a desired liquid level.

21. The liquid level sensor of claim 20 wherein the liquid level sensor is located within a heat exchanger.

22. The liquid level sensor of claim 20 wherein the fluid to be sensed is a refrigerant, and wherein the apparatus for cooling the fluid includes a connection to the source of the fluid whose liquid level is to be sensed, cooling conduit associated with the chamber, and a metering device within the cooling conduit.

23. The liquid level sensor of claim 20 wherein the sensor includes first and second parts located so as to bracket the desired liquid level.

24. A method of measuring liquid level in a heat exchanger comprising the steps of:

providing vapor and liquid communication between the heat exchanger and a sensing device so as to establish a liquid level within the sensing device which is representative of the liquid level in the heat exchanger;

subcooling the liquid in the sensing device;

measuring a temperature representative of a desired liquid level in the sensing device; and determining the liquid level from the measured temperature.

25. The method of measuring liquid level of claim 24 wherein no moving parts are used.

* * * * *